United States Patent
Ruelle (10) Patent No.: US 11,303,677 B2
(45) Date of Patent: Apr. 12, 2022

(54) METHOD AND SYSTEM FOR MANAGING THE OPERATION OF A GROUP OF SEVERAL CONNECTED OBJECTS

(71) Applicant: STMicroelectronics (Grand Ouest) SAS, Delarue (FR)

(72) Inventor: Frederic Ruelle, Marigné-Laillé (FR)

(73) Assignee: STMICROELECTRONICS (GRAND OUEST) SAS, Delarue (FR)

( * ) Notice: Subject to any disclaimer, the term of this patent is extended or adjusted under 35 U.S.C. 154(b) by 254 days.

(21) Appl. No.: 16/503,911

(22) Filed: Jul. 5, 2019

(65) Prior Publication Data

US 2020/0021616 A1    Jan. 16, 2020

(30) Foreign Application Priority Data

Jul. 16, 2018 (FR) ..................... 1856546

(51) Int. Cl.
| | |
|---|---|
| H04L 29/12 | (2006.01) |
| G06F 21/35 | (2013.01) |
| H04L 29/06 | (2006.01) |
| G06F 8/65 | (2018.01) |
| G06F 21/44 | (2013.01) |

(52) U.S. Cl.
CPC ............. H04L 63/20 (2013.01); G06F 8/65 (2013.01); H04L 63/0435 (2013.01); H04L 63/0442 (2013.01); H04L 63/0876 (2013.01)

(58) Field of Classification Search
None
See application file for complete search history.

(56) References Cited

U.S. PATENT DOCUMENTS

| | | | |
|---|---|---|---|
| 9,292,411 B2 * | 3/2016 | Chuang | G06F 13/00 |
| 10,782,957 B2 * | 9/2020 | Bamba | G06F 11/00 |
| 2011/0215736 A1 * | 9/2011 | Horbst | G05B 19/418 |
| | | | 315/297 |
| 2011/0301787 A1 * | 12/2011 | Chaperon | B64C 39/024 |
| | | | 701/2 |
| 2012/0311556 A1 * | 12/2012 | Matsukawa | G06F 8/654 |
| | | | 717/171 |
| 2013/0257289 A1 * | 10/2013 | VanWagoner | H05B 47/10 |
| | | | 315/152 |
| 2017/0302688 A1 | 10/2017 | Espes et al. | |
| 2018/0052681 A1 | 2/2018 | Pereira Cabral et al. | |

(Continued)

FOREIGN PATENT DOCUMENTS

FR    3026911 A1    4/2016

OTHER PUBLICATIONS

Axiom: DTLS-Based Secure IoT Group Communication. Tiloca. ACM. (Year: 2017).*

(Continued)

*Primary Examiner* — Venkat Perungavoor
(74) *Attorney, Agent, or Firm* — Slater Matsil, LLP (57) ABSTRACT

A method for managing the operation of a group of a plurality of connected objects includes exchanging information between two of the connected objects of the group. The information relates to a state of each connected object participating in the exchanging of information. The method also includes triggering an action on a connected object participating in the exchanging of information. The triggering is based on the information received by this object.

25 Claims, 4 Drawing Sheets

(56) References Cited

U.S. PATENT DOCUMENTS

2018/0103023 A1    4/2018  Linton et al.
2019/0319950 A1*  10/2019  Bowling ............. H04L 63/0876
2019/0334933 A1*  10/2019  Teshome ............... G06F 16/951
2020/0104112 A1*   4/2020  Hu .......................... H04L 67/34
2021/0006583 A1*   1/2021  Ryabenkiy ............. G06N 20/00

OTHER PUBLICATIONS

Proposing and verifying a security-enhanced protocol for IoT-based communication for medical devices. Han.Springer. (Year: 2016).*
Shaikh, Riaz Ahmed, et al., "Trusting Anomaly and Intrusion Claims for Cooperative Distributed Intrusion Detection Schemes of Wireless Sensor Networks", 9th International Conference for Young Computer Scientists, Nov. 18, 2008, pp. 2038-2043.

* cited by examiner

METHOD AND SYSTEM FOR MANAGING THE OPERATION OF A GROUP OF SEVERAL CONNECTED OBJECTS

CROSS-REFERENCE TO RELATED APPLICATIONS

This application claims priority to French Patent Application No. 1856546, filed on Jul. 16, 2018, which application is hereby incorporated herein by reference.

TECHNICAL FIELD

Embodiments relate to a method and system for managing the operation of a group of connected objects.

BACKGROUND

Generally, a connected object always remains in communication with another connected object or a server via an internet network, and is ready for one or more updates of its firmware in order to correct current operating errors or to acquire new features.

Nevertheless, such communications via the internet network are not always secure and unfortunately often open the possibility of modifications of the connected object via malicious software, or even the possibility of hacking, which could result in significant damage.

A conventional solution involves using, for each connected object, a mechanism based on cryptographic resources, for example, a digital signature, so as to verify the authorization of each intervention of this connected object. However, this mechanism is rolled out and executed individually on each connected object.

Once the malicious software or hacking operations have succeeded, despite everything, in taking control of the connected object, the latter generally no longer responds to security requests based, for example, on the digital signature and transmitted, for example, by a remote server. From the view of the remote server, the connected object is disconnected or in a failure condition.

Consequently, it is not always easy to identify the operating state of a connected object and it is all the more difficult to automatically restore a potentially modified or hacked connected object.

SUMMARY

Implementations and embodiments of the invention relate to the internet of objects, commonly known by the abbreviation IoT (Internet of Things). Particular embodiments relate to objects connected to the internet network in the broad sense, i.e., including, for example, the local area network (LAN) and the wide area network (WAN), which are intended to mutually communicate data and perform practical and more or less simple operations, such as connected luminous intensity detectors, connected temperature detectors, connected door-opening detectors and connected electrical switches.

Embodiments of the invention propose a technical solution of low complexity, low communication power consumption and low cost, providing for enhancing the security of mutually coupled connected objects by self-evaluations between each other, grouped verifications for each intervention of the connected objects, and possible restorations for the modified or hacked connected object or objects, without necessarily needing to have a server involved which is generally busy and capable of being attacked and neutralized by hackers.

According to one aspect, a method for managing the operation of a group of several connected objects comprises exchanges of information between at least two connected objects of the group, relating to at least one state of each connected object participating in these exchanges of information. The method also comprises a triggering of at least one action on at least one connected object having participated in these exchanges according to the information received by this object.

Such a method for managing the operation of connected objects by group advantageously provides for reducing the possibility of modifications via malicious software and the risk of hacking since connected objects in the same group can communicate with each other so as to perform periodic self-evaluations (between one another) and possible restorations if an abnormality in the operation of one or more connected objects in the group is detected.

It is appropriate to note that the size and topology of the group can, for example, in this case be dynamic. In other words, a connected object can be dynamically associated with or dissociated from the group so as to enhance the unpredictable character of the group. Thus, the security of the group is advantageously strengthened.

According to one implementation, the exchanges comprise periodic exchanges between the connected objects in the group, of first items of information relating to an operating state of the connected objects, and the triggering comprises an issuing of a first warning signal if the operating state of at least one connected object is incorrect and/or an issuing of a second warning signal in the event of a failure of the transmission, by at least one of the objects to the other objects, of first items of information relating to its operating state.

It is appropriate to note that a failure of transmission of information relating to the operating state of a connected object often means that the connected object has become faulty or that the connected object has been hacked.

Such a method provides for a periodic check on the operating state of each connected object in the group so as to identify one or more connected objects having irregular operating states.

The exchanges can, for example, additionally comprise periodic exchanges, between the connected objects in the group, of at least one parameter measured locally by each connected object, and the triggering can, for example, additionally comprise the issuing of the second warning signal if the periodic exchanges of the first items of information are successful, all the operating states are identical, and the at least one measured parameter of at least one connected object exceeds a nominal range of the nominal value of the at least one parameter, or a change of the at least one measured parameter of at least one connected object is different from that observed for the remainder of the group.

Advantageously, the correct operation of a connected object can be monitored by comparing the same parameter measured by the connected objects in a group. When the parameter measured by a connected object is too different from the nominal value, this connected object can be in a failure condition or have been modified or hacked.

It is appropriate to note that a change of the at least one measured parameter of at least one connected object is different from that observed for the remainder of the group when this change is, for example, rising with respect to falling changes observed by the remainder of the group.

According to another implementation, the exchanges comprise exchanges, following a firmware update request of at least one connected object in the group, of second items of information representative of a firmware update request state of the connected objects, and the triggering comprises a suspension of the firmware update request if at least one exchange of the second items of information is not successful or if the update request state of the at least one connected object making the update request is different from the update request state of at least one other connected object in the group.

Advantageously, with such a method, the update request of each connected object in the group is verified by comparing it with those of other connected objects in the group so as to strengthen the security of the group.

According to another implementation, the method additionally comprises an election step for the connected objects in the group so as to determine an elected connected object.

The exchanges comprise exchanges, within a chosen duration following a firmware update of the elected connected object, of third items of information representative of a firmware update state of the elected object. The triggering can comprise a firmware update of the other connected objects in the group if the update state of the elected connected object is positive. Alternatively, a suspension of firmware updates of the other connected objects in the group and an issuing of a third warning signal can occur if the update state of the elected connected object is negative or at least one exchange of the third items of information of the connected objects is not successful.

A positive state is, for example, a successful firmware update while a negative state is, for example, an update that has failed.

In other words, the firmware update of the other connected objects in the group is carried out only if the update state of the elected connected object that has already had the update is positive. Otherwise, a warning signal is generated so as to indicate a possible security problem for the connected objects in the group.

By way of non-limiting example, the exchanges can comprise exchanges between the connected objects of fourth items of information representative of a state of security of the connected objects. The triggering can comprise a determination of an authentic state of all the connected objects if the states of security of all the connected objects are identical, and an issuing of a fourth warning signal and a determination of a state of insecurity if the state of security of at least one connected object is different from those of the other connected objects.

Such a method also advantageously provides for a verification of the state of security, for example, via a digital signature, of the connected objects in the group.

According to yet another implementation, the exchanges comprise exchanges, between a first connected object in the group having failing firmware and at least a second connected object in the group, of fifth items of information representative of a firmware operating state of the first connected object and of the at least second connected object. The triggering comprises, if the firmware operating state of the at least second connected object is positive, a delivery of operational firmware of the at least second connected object to the first connected object and a firmware update of the first connected object with the operational firmware.

A positive firmware operating state is, for example, a correct or operational functioning of the firmware.

Here also, such a method provides for locating a failing or hacked connected object in the group with the aid of another connected object in the group which exhibits correct operation.

The delivery can, for example, be carried out from the at least second connected object or from a separate remote server.

By way of non-limiting indication, the firmware operating state comprises the version of the firmware used and a number of errors detected within a chosen duration, or a digital signature of the firmware.

According to another implementation, the connected objects are identical or compatible, and the exchanges and the at least one action are protected by symmetric cryptography.

Such a symmetric key is specific to the group and therefore does not allow a hacker to hack into the group, since a replicated object does not have the symmetric key.

As a variant, the connected objects can, for example, be identical or compatible. The exchanges and the at least one action can, for example, be protected by asymmetric cryptography.

According to another aspect, there is proposed an operation management system for a group of several mutually coupled connected objects and including a control module associated with each object.

Each control module has an exchange module configured to exchange, between at least two connected objects in the group, information relating to at least one state of each connected object participating in these exchanges of information, and a processing module configured to trigger at least one action on at least one connected object having participated in these exchanges according to the information received by this object.

Such a system advantageously provides improved protection against cyber attacks since the control module is better isolated from data input devices, such as peripheral devices and data exchange interfaces, incorporated in each connected object.

According to one embodiment, the exchange module is configured to periodically exchange between the connected objects in the group, first items of information relating to an operating state of the connected objects, and the processing module is configured to issue a first warning signal if the operating state of at least one connected object is incorrect and/or a second warning signal in the event of a failure of the transmission, by at least one of the objects to the other objects, of first items of information relating to its operating state.

By way of non-limiting example, the exchange module can additionally be configured to periodically exchange between the connected objects in the group at least one parameter measured locally by each connected object. The processing module can additionally be configured to issue the second warning signal if the exchanges of the first items of information are successful, all the operating states are identical, and the at least one measured parameter of at least one connected object exceeds a nominal range of the nominal value of the at least one parameter, or a change of the at least one measured parameter of at least one connected object is different from that observed for the remainder of the group.

According to another embodiment, the exchange module is additionally configured to exchange, following a firmware update request of at least one connected object in the group, second items of information representative of a firmware update request state of the connected objects. The processing module is additionally configured to suspend the firmware update request if at least one exchange of the second items of information is not successful or if the update request state of the at least one connected object making the update request is different from the update request state of at least one other connected object in the group.

According to yet another embodiment, the control module additionally comprises an election module configured to determine an elected connected object in the group.

The exchange module is additionally configured to exchange, within a chosen duration following a firmware update of the elected connected object, third items of information representative of a firmware update state of the elected object. The processing module is additionally configured to update firmware of the other connected objects in the group if the update state of the elected connected object is positive, or suspend firmware updates of the other connected objects in the group and issue a third warning signal if the update state of the elected connected object is negative or at least one exchange of the third items of information of the connected objects is not successful.

By way of non-limiting example, the exchange module can additionally be configured to exchange, between the connected objects, fourth items of information representative of a state of security of the connected objects. The processing module can additionally be configured to determine an authentic state of all the connected objects if the states of security of all the connected objects are identical, and issue a fourth warning signal and determine a state of insecurity if the state of security of at least one connected object is different from those of the other connected objects.

According to another embodiment, the exchange module is additionally configured to exchange, between a first connected object in the group having failing firmware and at least a second connected object in the group, fifth items of information representative of a firmware operating state of the first connected object and of the at least second connected object. The processing module is additionally configured to deliver, if the firmware operating state of the at least second connected object is positive, operational firmware of the at least second connected object to the first connected object, and update the firmware of the first connected object with the operational firmware.

The processing module can, for example, be configured to deliver the operational firmware from the at least second connected object or from a separate remote server.

The firmware operating state can, for example, comprise the version of the firmware used and a number of errors detected within a chosen duration, or a digital signature of the firmware.

According to another embodiment, the connected objects are identical or compatible, and each control module additionally comprises a protection module configured to protect the exchange module and the processing module by symmetric cryptography.

As a variant, the connected objects can, for example, be identical or compatible. Each control module can, for example, additionally comprise a protection module configured to protect the exchange module and the processing module by asymmetric cryptography.

By way of non-limiting indication, the connected objects can, for example, be objects chosen from the group formed by the following objects: connected bulbs, connected sensors, connected enclosures and connected monitoring equipment.

According to another aspect, there is proposed a connected object belonging to the system defined above.

BRIEF DESCRIPTION OF THE DRAWINGS

Other advantages and features of the invention will become clearer upon examining the detailed description of implementations and embodiments, which are not at all limiting, and accompanying drawings in which.

DETAILED DESCRIPTION OF ILLUSTRATIVE EMBODIMENTS

Figure 1:
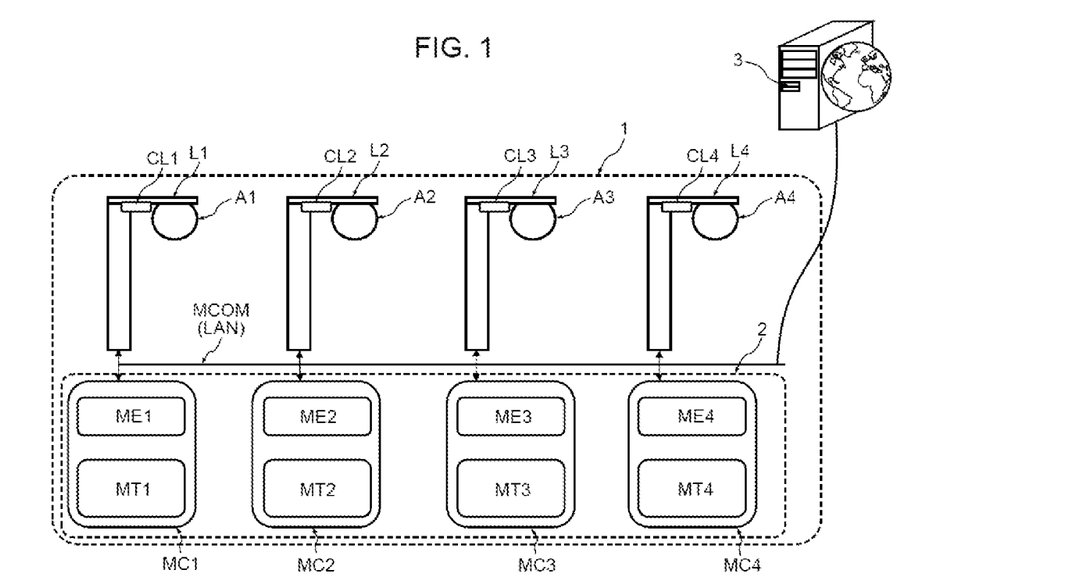
FIGS. 1 to 7 schematically illustrate implementations and embodiments of the invention.

FIG. 1 illustrates an example embodiment of a group 1 of several connected objects, in this case for example, four connected external street lights L1, L2, L3, L4, and an operation management system 2 for the group 1.

By way of non-limiting example, the structures and operation of the four street lights L1, L2, L3, L4 are compatible, perhaps even identical, and these four street lights L1, L2, L3, L4 are located in the same street.

Each street light L1, L2, L3, L4 includes a connected bulb A1, A2, A3, A4 configured to be on or off in a controlled manner, and a connected luminosity sensor CL1, CL2, CL3, CL4 configured to detect the intensity of luminosity around the connected bulb A1, A2, A3, A4.

The four street lights L1, L2, L3, L4 are mutually coupled via communication network MCOM, in this case for example, via a local area network LAN, and coupled to a remote control server 3, for example, via the internet network.

The operation management system 2 includes, for each street light L1, L2, L3, L4, a control module MC1, MC2, MC3, MC4 coupled to the corresponding connected bulb A1, A2, A3, A4 and to the corresponding connected luminosity sensor CL1, CL2, CL3, CL4 and configured to manage the operation of the corresponding street light L1, L2, L3, L4 and strengthen the security of the group.

It is appropriate to note that each control module MC1, MC2, MC3, MC4 can be coupled to the local area network LAN so as to communicate with the other control modules MC1, MC2, MC3, MC4 in the group 1 via the local area network LAN, or have an application programming interface (API) enabling communications via dedicated software applications, using static IP (Internet Protocol) addresses, or even a network that is separate and reserved for the communication network MCOM. In the latter case, data exchanges within the group are advantageously not visible to a possible hacker who would attack the connected object via the main network.

Each control module MC1, MC2, MC3, MC4 is, for example, produced in the form of an STM32®L4 microcontroller, of the company STMicroelectronics, known to the person skilled in the art.

Advantageously, such a control module MC1, MC2, MC3, MC4 in the microcontroller can be isolated in a virtual manner so as to allow the microcontroller to perform other operations such as controlling the connected bulb.

By way of non-limiting example, communications between the street lights L1, L2, L3, L4 and the operation management system 2 can be secured with the aid of symmetric cryptography, known to the person skilled in the art, for example, with a common private key.

As an alternative solution, the communications can also be protected with the aid of asymmetric cryptography, known to the person skilled in the art, for example, with public and private keys.

Each control module MC1, MC2, MC3, MC4 comprises exchange modules ME1, ME2, ME3, ME4 configured to exchange between at least two connected objects in the group 1 information relating to the at least one state of each connected object participating in these exchanges of information, and a processor MT1, MT2, MT3, MT4 configured to trigger at least one action on at least one connected object having participated in these exchanges according to the information received by this object.

The exchange modules ME1, ME2, ME3, ME4 are implemented in the form of software applications and can be updated directly when the control modules MC1, MC2, MC3, MC4 are in operation.

As a variant, the exchange modules ME1, ME2, ME3, ME4 can be implemented in a fixed manner like the control modules MC1, MC2, MC3, MC4.

However, the processing modules MT1, MT2, MT3, MT4 can never be updated when the control modules MC1, MC2, MC3, MC4 are in operation so as to ensure the security of the group 1.

As a variant, the processing modules MT1, MT2, MT3, MT4 can, for example, never be updated in order to prevent possible physical attacks of the operation management system 2.

Figure 2:
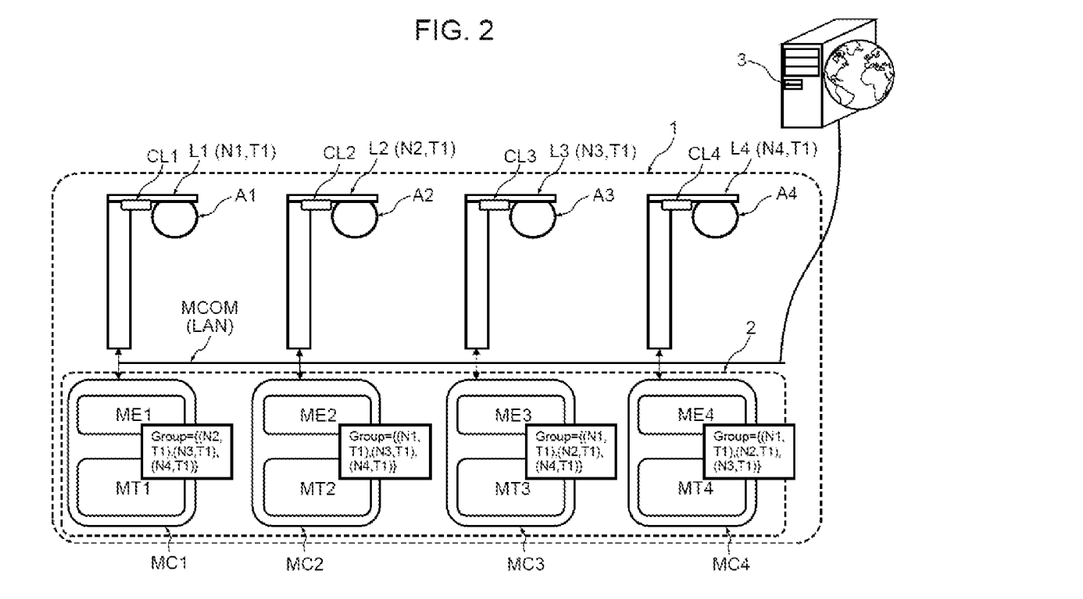

Reference is now made to FIG. 2 to illustrate an example of a step referred to as "discovery" of the operation management system 2 of the group 1.

In this discovery step, the four street lights L1, L2, L3, L4 and the control modules MC1, MC2, MC3, MC4 are mutually coupled via the local area network LAN.

Each street light L1, L2, L3, L4 has an identity number N1, N2, N3, N4 for the control modules MC1, MC2, MC3, MC4 to be able to identify them and a type number to recognize its characteristics. The four street lights are identical and therefore each have the same type number, in this case for example, T1.

When the group 1 of the connected street lights L1, L2, L3, L4 is operational for the first time, the exchange modules ME1, ME2, ME3, ME4 of each control module MC1, MC2, MC3, MC4 are configured to exchange with its corresponding street light L1, L2, L3, L4 and the other street lights in the group 1 so as to retrieve the identity numbers N1, N2, N3, N4 and the type numbers T1 of all the street lights and then deliver these identity numbers N1, N2, N3, N4 and the type numbers T1 to the corresponding processing modules MT1, MT2, MT3, MT4.

The processing modules MT1, MT2, MT3, MT4 of each control module MC1, MC2, MC3, MC4 are configured to save, respectively, the identity numbers of the other street lights in the group 1.

For example, for the processing module MT1 of the control module MC1, the saved identity numbers are N2, N3 and N4.

Reference is now made to FIGS. 3 to 7 to illustrate example implementations of the operation management system 2 for the group 1.

Figure 3:
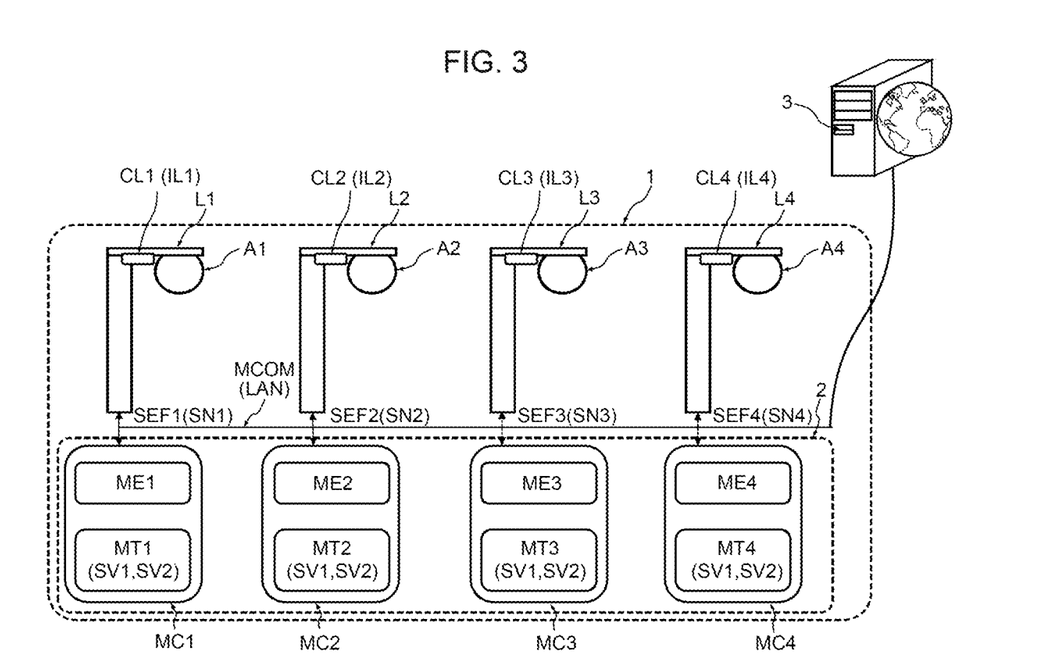

In the example illustrated in FIG. 3, there is illustrated an example implementation of the monitoring of the operating state of the connected street lights L1, L2, L3, L4 in the group 1.

The exchange modules ME1, ME2, ME3, ME4 of each control module MC1, MC2, MC3, MC4 are configured to periodically exchange with each other first items of information relating to an operating state of the connected street lights L1, L2, L3, L4, in this case for example, an operating state signal SEF1, SEF2, SEF3, SEF4 of each street light L1, L2, L3, L4.

Each operating state signal SEF1, SEF2, SEF3, SEF4 includes, for example, a digital signature SN1, SN2, SN3, SN4 calculated with the aid of a symmetric key common to the connected street lights L1, L2, L3, L4 in the group 1 in order to facilitate the verification of the operating state of each street light L1, L2, L3, L4.

If at least one operating state of these street lights L1, L2, L3, L4 is incorrect, in other words at least one digital signature SN1, SN2, SN3, SN4 is incorrect, or at least one exchange between these street lights L1, L2, L3, L4 is not successful, i.e., the verification of at least one signature SN1, SN2, SN3, SN4 has not succeeded, the processing modules MT1, MT2, MT3, MT4 of each control module MC1, MC2, MC3, MC4 are configured to issue a first warning signal SV1 so as to alert about the abnormality in the group 1.

The exchange modules ME1, ME2, ME3, ME4 of each control module MC1, MC2, MC3, MC4 are additionally configured to periodically exchange with each other at least one parameter measured locally by each connected luminosity sensor CL1, CL2, CL3, CL4, in this case for example, a signal representative of the luminous intensity IL1, IL2, IL3, IL4 measured by each connected luminosity sensor CL1, CL2, CL3, CL4.

Since these street lights L1, L2, L3, L4 are located in the same street, the temporal transition of the luminous intensity measured by each connected luminosity sensor CL1, CL2, CL3, CL4 is anticipated to be similar and in the same direction.

The processing modules MT1, MT2, MT3, MT4 of each control module MC1, MC2, MC3, MC4 are additionally configured to issue a second warning signal SV2 so as to indicate an abnormality of the at least one street light L1, L2, L3, L4 in the group 1, if the verification of the digital signature SN1, SN2, SN3, SN4 of at least one street light L1, L2, L3, L4 is successful but the luminous intensity IL1, IL2, IL3, IL4 measured by each connected luminosity sensor CL1, CL2, CL3, CL4 exceeds the nominal range, or if a change of at least one measured luminous intensity IL1, IL2, IL3, IL4 is different from that observed for the remainder of the group 1 (for example, the measured luminous intensity IL1 has a rising change and the other measured intensities IL2, IL3, IL4 have a falling change).

By way of example, the first warning signal SV1 and the second warning signal SV2 can be identical.

Figure 4:
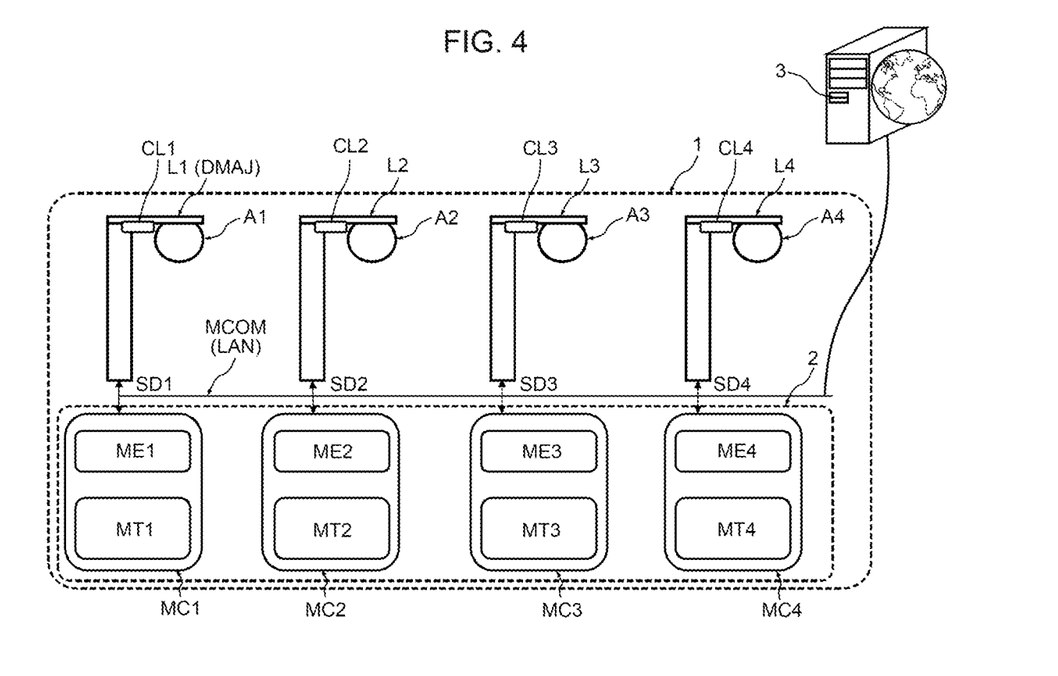

FIG. 4 illustrates an example implementation of the operation management system 2 when the exchange module of at least one connected street light in the group 1, in this case for example, the street light L1, issues a firmware update request DMAJ.

Following this update request DMAJ, the exchange modules ME1, ME2, ME3, ME4 of each control module MC1, MC2, MC3, MC4 are configured to exchange two items of information representative of a firmware update request state of the street lights L1, L2, L3, L4, in this case for example, a request signal SD1, SD2, SD3, SD4, so as to verify whether the firmware update request DMAJ is synchronized with the other street lights L2, L3, L4 in the group 1.

The processing modules MT1, MT2, MT3, MT4 are then configured to suspend the firmware update request DMAJ if at least one exchange of the request signals SD1, SD2, SD3, SD4 is not successful, or if the update request state of the street light L1 making the update request DMAJ is different from the update request state of at least one other street light L2, L3, L4 in the group 1.

When the at least one exchange is not successful, it is possible that this or these exchanges are blocked by the street light L1 making the firmware update request DMAJ.

For the case in which the update request DMAJ is not synchronized with the other street lights L2, L3, L4 in the group 1, the update request DMAJ is capable of not being authorized by the group 1.

In these two cases mentioned above, the processing modules MT1, MT2, MT3, MT4 are configured to mark the at least one street light making the update request as an object likely to be failing or hacked.

Moreover, the update request DMAJ can, for example, be considered to be invalid by the processing modules MT1, MT2, MT3, MT4 if no other update request is detected at the end of a chosen delay, in this case for example, 24 hours, following the firmware update request DMAJ.

Figure 5:
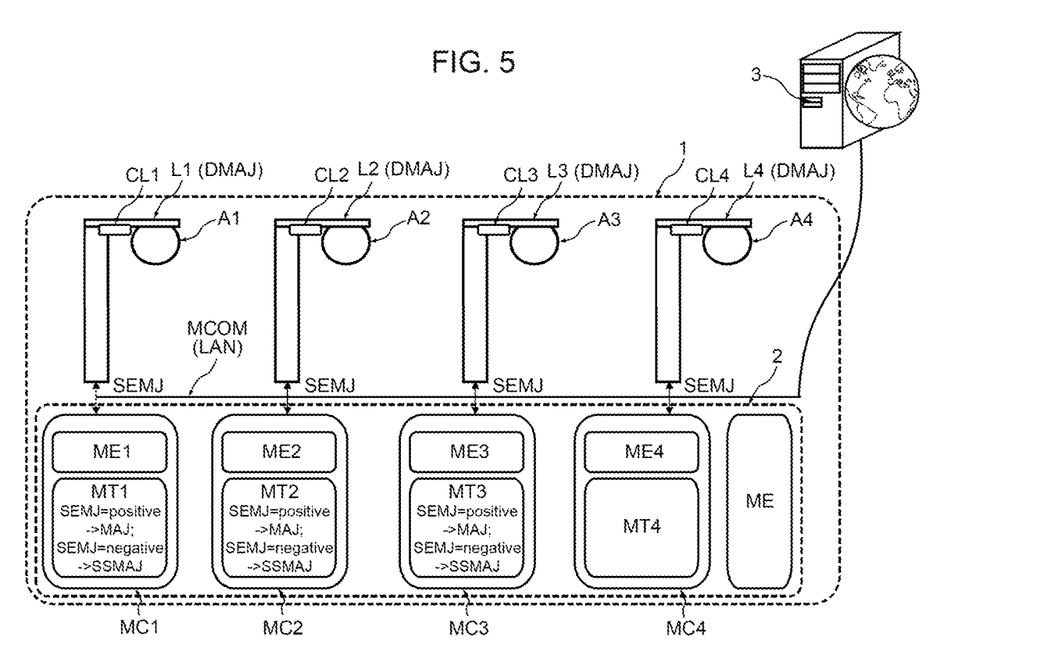

FIG. 5 illustrates another example implementation of the operation management system 2 when the exchange modules ME1, ME2, ME3, ME4 of all the connected street lights L1, L2, L3, L4 in the group 1 issue the same firmware update request DMAJ.

The control module 2 additionally comprises an election module ME coupled to the four street lights L1, L2, L3, L4 in the group 1, and configured to determine an elected street light LE, in this case for example, the street light L4 in the group 1.

Once the elected street light LE is determined, the processing module MT4 of the elected street light LE is configured to proceed with the firmware update (MAJ).

The exchange modules ME1, ME2, ME3, ME4 of each control module MC1, MC2, MC3, MC4 are then configured to exchange, within a chosen duration, in this case for example, 24 hours, following the firmware update MAJ of the elected street light LE, third items of information representative of an elected street light LE firmware update state, in this case for example, an update state signal SEMJ of the elected street light LE.

When the signal SEMJ is in its positive state, the processing modules MT1, MT2, MT3 of the other connected street lights L1, L2, L3 are configured to update firmware of the other connected street lights L1, L2, L3 in the group 1 with the same firmware as the elected street light LE.

When the signal SEMJ is in its negative state or at least one exchange of the signal SEMJ is not successful, the processing modules MT1, MT2, MT3 of the other connected street lights L1, L2, L3 are configured to suspend firmware updates of the other connected street lights in the group 1 and to issue a third warning signal, in this case for example, an update suspension signal SSMAJ.

Figure 6:
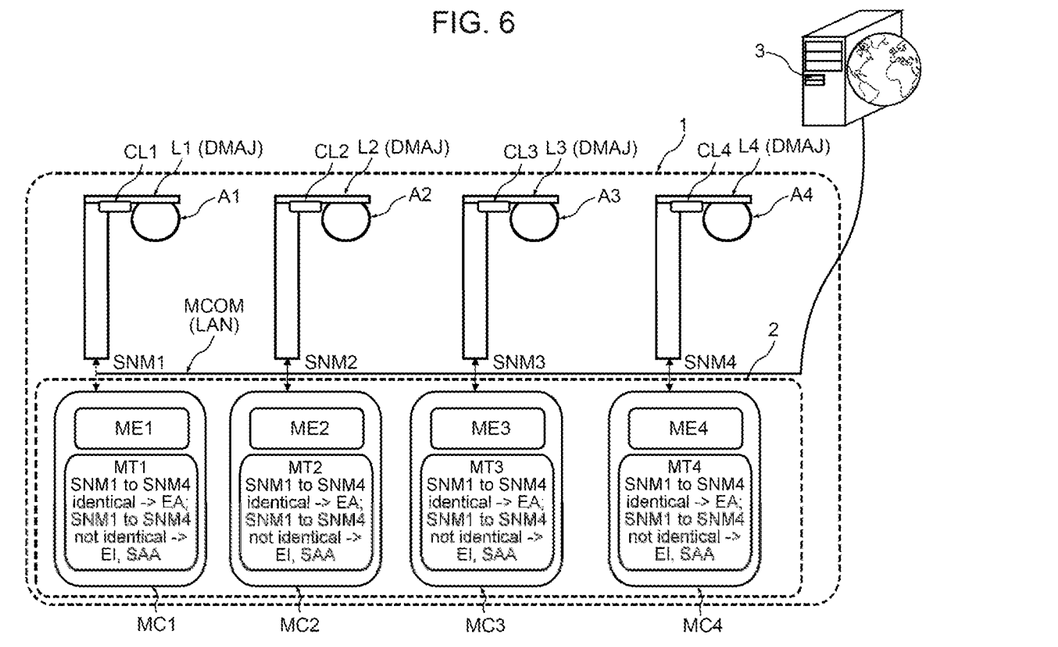

FIG. 6 illustrates another example implementation of the operation management system 2 to verify the authentication of the firmware of the connected street lights L1, L2, L3, L4 in the group 1.

The exchange modules ME1, ME2, ME3, ME4 of each control module MC1, MC2, MC3, MC4 are configured to exchange with each other fourth items of information representative of a state of security of the street lights L1, L2, L3, L4 in the group 1, in this case, for example, a firmware digital signature SNM1, SNM2, SNM3, SNM4 known to the person skilled in the art.

The processing modules MT1, MT2, MT3, MT4 of each control module MC1, MC2, MC3, MC4 are additionally configured to determine an authentic state EA of all the street lights L1, L2, L3, L4 in the group 1 if the firmware digital signatures SNM1, SNM2, SNM3, SNM4 are identical, and to issue a fourth warning signal, in this case, for example, an authentication warning signal SAA, and determine a state of insecurity E1 if the firmware digital signature SNM1, SNM2, SNM3, SNM4 of at least one street light L1, L2, L3, L4 is different from that of the other connected street lights.

By way of example, if the firmware digital signatures SNM1, SNM2, SNM3 of the street lights L1, L2, L3 are identical but different from that of the street light L4, the security of the group 1 can no longer be ensured and the group 1 is in the state of insecurity.

Figure 7:
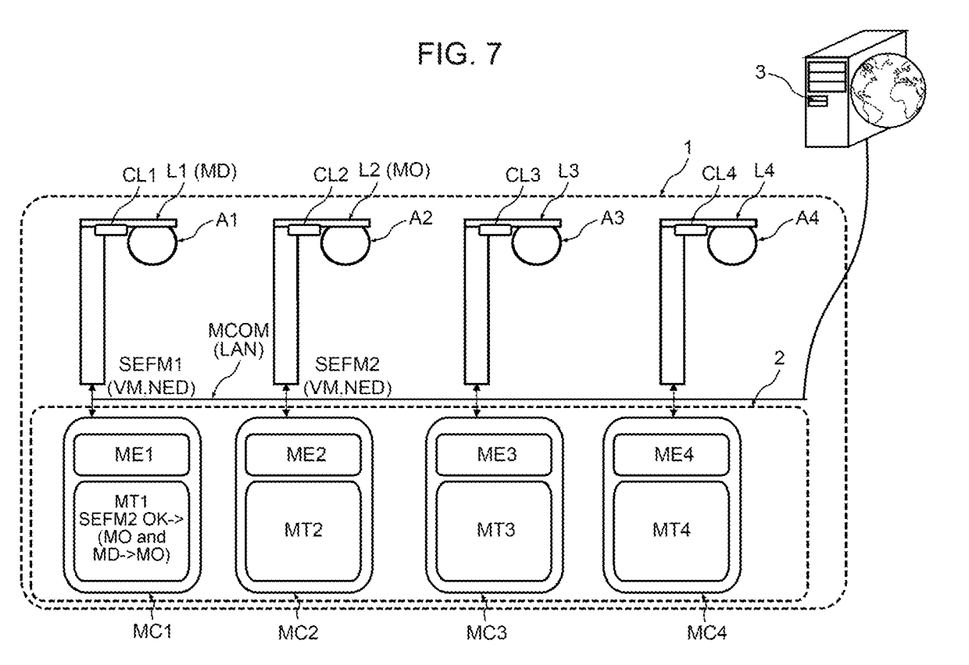

FIG. 7 illustrates yet another example implementation of the operation management system 2 when a street light, in this case for example, the street light L1, in the group 1, includes failing firmware MD.

The exchange modules ME1 of the control module MC1 are configured to exchange with at least one other connected street light, in this case for example, the street light L2, in the group 1, fifth items of information representative of a firmware operating state of the street light L1 and of the street light L2, in this case for example, firmware operating state signals SEFM1, SEFM2.

By way of non-limiting indication, each firmware operating state signal SEFM1, SEFM2 can comprise the version of the firmware VM used and a number of errors detected NED within a chosen duration, for example, one hour or one day, or a digital signature of the firmware VM.

If the firmware operating state signal SEFM2 of the street light L2 is positive, in other words the firmware of the street light L2 is operational, the processing module MT2 of the street light L2 are configured to deliver, under the request of the processing module MT1 of the street light L1, the operational firmware MO of the street light L2 to the first street light L1. The processing module MT1 of the street light L1 is configured to update its failing firmware MD with the operational firmware MO.

As a result, the connected street lights L1, L2, L3, L4 in the group 1 are capable of locally restoring one or more failing firmware MD.

As a variant, the remote control server 3 is configured to deliver, upon the request of the processing module MT1 of the street light L1, the operational firmware MO to the first street light L1.

The processing module MT1 of the street light L1 is configured to update its failing firmware MD with the operational firmware MO of the control server 3.

Thus, the connected street lights L1, L2, L3, L4 in the group 1 are also capable of remotely restoring one or more failing firmware MD.

What is claimed is:

1. A method for managing operation of a group of connected objects, the method comprising:
exchanging information between two connected objects of the group, the information relating to a state of each connected object participating in the exchanging of information, the exchanging of the information comprising periodically exchanging, between the two connected objects, first items of information relating to an operating state of the two connected objects; and
triggering an action on a first connected object participating in the exchanging of information, the triggering an action based on the information received by the first connected object and the triggering an action comprising issuing a first warning signal when the operating state of the first connected object or a second connected object participating in the exchange is incorrect or issuing a second warning signal when the first connected object fails to exchange the first items of information with the second connected object or the second connected object fails to exchange the first items of information with the first connected object.

2. The method according to claim 1, wherein exchanging the information further comprises periodically exchanging a parameter measured locally by each of the two connected objects between the connected objects, and wherein the triggering an action further comprises issuing the second warning signal when the following occurs together:
the periodic exchanges of the first items of information are successful;
all the operating states are identical; and
the parameter of one of the two connected objects exceeds a nominal range of a nominal value of the parameter, or a change of the parameter of the first connected object is different from that observed by the second connected object.

3. The method according to claim 1, wherein
exchanging the information comprises exchanging second items of information representative of a firmware update request state of each of the two connected objects following a firmware update request of one of the two connected objects; and
the triggering an action comprises suspending the firmware update request when an exchange of the second items of information is not successful or when the firmware update request state of the connected object making the firmware update request is different from the firmware update request state of an other connected object.

4. The method according to claim 1, further comprising performing an election step for the two connected objects so as to determine an elected connected object and an unelected connected object, wherein
exchanging the information comprises exchanging, within a chosen duration following a firmware update of the elected connected object, third items of information representative of a firmware update state of the elected connected object; and
the triggering an action comprises:
performing a firmware update of the unelected connected object when the firmware update state of the elected connected object is positive; and
suspending firmware updates of the unelected connected object and issuing a third warning signal when the firmware update state of the elected connected object is negative or at least one exchange of the third items of information of the two connected objects is not successful.

5. The method according to claim 1, wherein
exchanging the information comprises exchanging fourth items of information between the two connected objects, the fourth items of information being representative of a state of security of the two connected objects; and
the triggering an action comprises:
determining an authentic state of the two connected objects when the states of security of the two connected objects are identical; and
issuing a fourth warning signal and determining a state of insecurity when the state of security of the first connected object is different from the state of security of the second connected object.

6. The method according to claim 1, wherein
exchanging the information comprises exchanging fifth items of information between the two connected objects, the fifth items of information being representative of a firmware operating state of the first connected object and of the second connected object; and
the triggering an action comprises delivering operational firmware of the second connected object to the first connected object and performing a firmware update of the first connected object with the operational firmware when the firmware operating state of the second connected object is positive.

7. The method according to claim 6, wherein the delivering is carried out from the second connected object or from a separate remote server.

8. The method according to claim 6, wherein the firmware operating state comprises a version of the firmware used and a number of errors detected within a chosen duration, or a digital signature of the firmware.

9. The method according to claim 1, wherein the two connected objects are identical or compatible and the exchanging and an action triggered are protected by symmetric cryptography.

10. The method according to claim 1, wherein the two connected objects are identical or compatible and the exchanging and an action triggered are protected by asymmetric cryptography.

11. An operation management system for a group of mutually coupled connected objects that each include an associated microcontroller, each microcontroller comprising:
a memory;
a processor; and
wherein each microcontroller is configured to
exchange state information between a plurality of connected objects in the group, the state information relating to a state of each connected object participating in the exchange of the state information,
periodically exchange first items of information between the connected objects in the group, the first items of information relating to an operating state of the connected objects,
trigger an action on a first connected object participating in the exchange of the state information according to the state information received by the first connected object, and
issue a first warning signal when the operating state of the first connected object is incorrect or a second warning signal when there is a failure of transmission, between the connected objects in the group, of the first items of information.

12. The system according to claim 11, wherein:
each microcontroller is further configured to periodically exchange a parameter between the connected objects in the group, the parameter measured locally by each connected object; and
each microcontroller is further configured to issue the second warning signal when the following occurs together
the exchanges of the first items of information are successful;
all the operating states are identical; and
the parameter of a connected object exceeds a nominal range of a nominal value of the parameter, or a change of the parameter of one connected object is different from a parameter observed for an other connected object of the group.

13. The system according to claim 11, wherein
each microcontroller is further configured to exchange second items of information representative of a firmware update request state of the connected objects following a firmware update request of a requesting connected object in the group; and
each microcontroller is further configured to suspend the firmware update request when an exchange of the second items of information is not successful or when the firmware update request state of the requesting connected object is different from the firmware update request state of a non-requesting one of the connected objects in the group.

14. The system according to claim 11, wherein:
each microcontroller is further configured to exchange third items of information representative of a firmware update state of an elected connected object within a chosen duration following a firmware update of the elected connected object; and
each microcontroller is further configured to
update firmware of other connected objects in the group when the firmware update state of the elected connected object is positive; and
suspend firmware updates of the other connected objects in the group and issue a third warning signal when the firmware update state of the elected connected object is negative or when an exchange of the third items of information of the connected objects is not successful.

15. The system according to claim 11, wherein
each microcontroller is further configured to exchange fourth items of information between the connected objects, the fourth items of information being representative of a state of security of the connected objects; and
each microcontroller is further configured to
determine an authentic state of all the connected objects when states of security of all the connected objects are identical; and
issue a fourth warning signal and determine a state of insecurity when a state of security of one connected object is different than a state of security of another connected object of the group.

16. The system according to claim 11, wherein
each microcontroller of the first connected object and a second connected object is further configured to exchange fifth items of information between the first connected object in the group having failing firmware and the second connected object in the group, the fifth items of information being representative of a firmware operating state of the first connected object and of the second connected object; and
the microcontroller of the second connected object is further configured to deliver operational firmware of the second connected object to the first connected object when the firmware operating state of the second connected object is positive; and
the microcontroller of the first connected object is further configured to update the firmware of the first connected object with the operational firmware when the firmware operating state of the second connected object is positive.

17. The system according to claim 16, wherein the microcontroller of the second connected object is further configured to deliver the operational firmware from the second connected object or from a separate remote server.

18. The system according to claim 16, wherein the firmware operating state comprises a version of the firmware used and a number of errors detected within a chosen duration, or a digital signature of the firmware.

19. The system according to claim 11, wherein the connected objects are identical or compatible, and each microcontroller is configured to protect itself by symmetric cryptography.

20. The system according to claim 11, wherein the connected objects are identical or compatible, and each microcontroller is configured to protect itself by asymmetric cryptography.

21. The system according to claim 11, wherein the connected objects each comprise an object selected from the group consisting of connected bulbs, connected sensors, connected enclosures and connected monitoring equipment.

22. A method for managing operation of a group of connected objects, the method comprising:
exchanging information between two connected objects of the group, the information relating to a state of each connected object participating in the exchanging of information, the exchanging the information comprising exchanging second items of information representative of a firmware update request state of each of the two connected objects following a firmware update request of a requesting one of the two connected objects; and
triggering an action on a first connected object participating in the exchanging of information, the triggering an action based on the information received by the first connected object, the triggering an action comprising suspending the firmware update request when an exchange of the second items of information is not successful or when the firmware update request state of the requesting one of the two connected objects is different from the firmware update request state of a non-requesting one of the two connected objects.

23. The method according to claim 22, further comprising performing an election step for the two connected objects so as to determine an elected connected object and an unelected connected object, wherein
exchanging the information comprises exchanging, within a chosen duration following a firmware update of the elected connected object, third items of information representative of a firmware update state of the elected connected object; and
the triggering an action comprises:
performing a firmware update of the unelected connected object when the firmware update state of the elected connected object is positive; and
suspending firmware updates of the unelected connected object and issuing a third warning signal when the firmware update state of the elected connected object is negative or at least one exchange of the third items of information of the two connected objects is not successful.

24. The method according to claim 22, wherein
exchanging the information comprises exchanging fourth items of information between the two connected objects, the fourth items of information being representative of a state of security of the two connected objects; and
the triggering an action comprises:
determining an authentic state of the two connected objects when the states of security of the two connected objects are identical; and issuing a fourth warning signal and determining a state of insecurity when the state of security of one of the two connected objects is different from the state of security of an other one of the two connected objects.

25. The method according to claim 22, wherein
exchanging the information comprises exchanging fifth items of information between the two connected objects, the fifth items of information being representative of a firmware operating state of the first connected object and of a second connected object; and
the triggering an action comprises delivering operational firmware of the second connected object to the first connected object and performing a firmware update of the first connected object with the operational firmware when the firmware operating state of the second connected object is positive.

* * * * *